United States Patent [19]

Abayasekara

[11] Patent Number: 5,354,587
[45] Date of Patent: Oct. 11, 1994

[54] HYDROPHILIC COMPOSITIONS WITH INCREASED THERMAL AND SOLVENT RESISTANCE

[75] Inventor: Dilip R. Abayasekara, Newark, Del.

[73] Assignee: W. L. Gore & Associates, Inc., Newark, Del.

[21] Appl. No.: 153,115

[22] Filed: Nov. 15, 1993

[51] Int. Cl.$^5$ .................................... B29D 22/00
[52] U.S. Cl. ............................ 428/36.6; 428/138; 428/272; 428/290; 428/422; 210/500.21; 210/500.23; 210/500.42; 210/500.36; 524/503; 525/56; 525/57; 525/60
[58] Field of Search ................ 525/57, 60, 56; 524/503; 210/500.21, 500.23, 500.42, 500.36; 428/36.6, 138, 272, 290, 422

[56] References Cited

U.S. PATENT DOCUMENTS

| | | | |
|---|---|---|---|
| 4,557,955 | 12/1985 | Walch et al. | 428/35 |
| 4,778,596 | 10/1988 | Linder et al. | 210/638 |
| 4,851,472 | 7/1989 | Famili et al. | 525/60 |
| 5,032,282 | 7/1991 | Linder et al. | 210/651 |
| 5,053,470 | 10/1991 | Wu | 525/60 X |
| 5,130,024 | 7/1992 | Fujimoto et al. | 210/500.36 |
| 5,173,556 | 12/1992 | Mares et al. | 525/60 X |
| 5,194,543 | 3/1993 | Schlipf et al. | 525/60 X |
| 5,200,442 | 4/1993 | Schlipf et al. | 525/60 X |
| 5,219,927 | 6/1993 | Moggi et al. | 525/60 X |

*Primary Examiner*—Judy M. Reddick
*Attorney, Agent, or Firm*—Gary A. Samuels

[57] ABSTRACT

A fluid filtration material made of a porous substrate, e.g. a membrane or a fabric that is coated with a fluorinated copolymer that contains recurring vinyl alcohol units to impart hydrophilicity. The material is crosslinked with multifunctional epoxides to maintain hydrophilicity on exposure to heat or solvent.

8 Claims, No Drawings

HYDROPHILIC COMPOSITIONS WITH INCREASED THERMAL AND SOLVENT RESISTANCE

FIELD OF THE INVENTION

This invention relates to substrates such as films or fabrics and the like, rendered hydrophilic by the presence of a hydrophilic coating on the substrate and especially to porous structures useful in filtration.

BACKGROUND OF THE INVENTION

Recently, a hydrophilic porous fluoropolymer membrane was disclosed in U.S. Pat. No. 5,130,024. In this patent, normally hydrophobic fluoropolymer membrane is rendered hydrophilic by coating the pores with a hydrophilic fluorine-containing copolymer. Increasing the hydrophilicity of filtration membranes increases their efficiency in filtration applications involving filtering aqueous compositions. A typical such copolymer taught by this patent is a copolymer of a) a monomer of the formula $CXY=CFZ$ where Z can be fluorine or hydrogen, and X and Y can be H, F, Cl or $CF_3$ (preferably they are all F), and b) a monomer of the formula

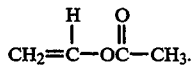

This copolymer, after saponification of the acetate group to hydroxyl, is coated on the pores of the membrane to provide hydrophilicity to the membrane. The coating is durable because of the fluorocarbon attraction between the membrane $CF_2$ groups and the copolymer CF bonds. Hydrophilicity is provided by the conversion of the

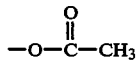

(acetate) side groups in the copolymer to —OH groups, thus forming vinyl alcohol recurring units in the copolymer chain. This copolymer will be referred to hereinafter sometimes as the VOH copolymer.

The VOH copolymer coating of hydrophobic substrates increases their surface free energy significantly. This makes such coated substrates spontaneously wettable by high surface tension liquids such as water, which consequently opens up the use of such substrates to aqueous filtration applications. Some other potential applications are in the area of increased adhesion to high surface energy substrates, and use in biomedical devices, among others.

While the potential for such applications are promising, the VOH-copolymer coating suffers from two drawbacks: (1) Loss of hydrophilicity because of lack of heat resistance at temperatures above 120° C.; (2) Lack of resistance to organic solvents such as methyl alcohol and N, N-dimethylformamide.

When a VOH-copolymer coated membrane is heated at 120° C. and above, it has been observed that the water-wettability of the substrate becomes reduced, i.e., it is either no longer water-wettable or it requires a longer contact time with water or a higher contact pressure in order to become fully wet. Steam sterilization at 120° C. for 0.5 hour also has such a deleterious effect on the water-wettability of the VOH-copolymer coated substrates. Analysis via nuclear magnetic resonance spectroscopy as well as infrared spectroscopy of the VOH-copolymer before and after heating demonstrates that the loss of water-wettability upon heating is not caused by a chemical change in the VOH-copolymer. This leaves the possibility that the deleterious effect on water-wettability is caused by a physical change of the VOH-copolymer. This change could be in the form of C—OH bond rotations. If the hydroxy groups are rotated away from the surface of the substrate into its bulk, the hydroxy groups will no longer be in the optimum orientation for "receiving" and hydrogen bonding with incoming water.

SUMMARY OF THE INVENTION

In this invention, the above problems have been solved by chemically cross-linking the VOH-copolymer in such a way that when cross-linking occurs, there is no net loss of hydroxyl functionality. The crosslinking will have a restrictive effect on C—OH bond rotation and also will prevent the copolymer from being solubilized by any solvent. The hydrophilicity is maintained by crosslinking the —OH moieties with a multifunctional epoxide to lock the molecules into a rigid structure, and thus prevent rotation.

Thus, in this invention a hydrophilic composition is provided comprising a substrate, preferably having continuous pores through it, in which at least a portion of the substrate is coated with a copolymer of a fluorinated monomer and vinyl alcohol, wherein the vinyl alcohol units are crosslinked by reaction with a multifunctional epoxide. Preferably the substrate is a microporous fluorocarbon membrane.

DESCRIPTION OF THE INVENTION

The substrate is preferably permeable and can be any material that allows fluids, liquid or gas, to pass through. It is a material that contains continuous passages extending through the thickness of the material, and openings on both sides. These passages can be considered as interstices or pores. Preferably the material is flexible and is in the form of a fabric, sheet, film, tube, mesh, fiber, plug, or the like. Suitable fabrics include nonwovens, wovens, knits, scrims, or the like. The material can also be a porous synthetic or natural polymeric film or membrane, where the pores form the interstices or passageways. Representative polymers useful in the material include polyamide, polyurethane, polyester, polycarbonate, polyacrylic, polyolefins such as polyethylene and polypropylene, or fluorinated polymers such as polyvinylidene fluoride or polytetrafluoroethylene, polyvinyl chloride and the like. The material will generally be from about 1 to about 200 micrometers thick. In order to promote adherence of the coating to the substrate, the coating should have groups or moieties that have an affinity for the substrate. In other words, if the substrate contains fluorocarbon groups, then a coating material that contains fluorocarbon groups will be more likely to adhere and be an effective coating. Preferably, the substrate is a flexible porous material such as expanded porous polytetrafluoroethylene (ePTFE) sheet made as described in U.S. Pat. No. 3,953,566 by stretching PTFE resin. The resulting product has a microstructure of nodes interconnected with fibrils. The PTFE resin is stretched so that the micropores or voids that form allow for good gas or air flow while providing liquid water resistance. These porous PTFE sheets, which can be referred to as membranes or fibers preferably have a Gurley number of between 0.1 second and 80 seconds, depending on pore size and pore volume.

When the material is polytetrafluoroethylene it will have a porosity volume ranging usually from 15% to 95%, preferably from 50% to 95%.

The copolymers used to coat the substrate can be made by first copolymerizing a fluorine-containing ethylenically unsaturated monomer and a non-fluorinated vinyl acetate.

The fluorine-containing ethylenically unsaturated monomer will be a vinyl monomer such as, for example, tetrafluoroethylene, vinyl fluoride, vinylidene fluoride, monochloro-trifluorethylene, dichlorodifluoroethylene, hexafluoropropylene, perfluoropropylvinyl ether, and the like. Preferably, the fluorine-containing vinyl monomer can be described as XCY=CFZ wherein Z can be fluorine or hydrogen and X and Y can each be selected from hydrogen, fluorine, chlorine, or —CF$_3$.

Once the vinyl acetate-containing copolymer is prepared, the acetate groups are saponified to hydroxyl groups. In this case, not all of the acetate groups contained in the copolymer need be replaced by hydroxyl groups. The conversion of acetate groups into hydroxyl groups need only be carried out to the extent needed to provide the copolymer with hydrophilic properties.

The fluorine content of the fluorine-containing hydrophilic copolymer to be used as the coating in the present invention may range usually from 2% to 40%, preferably from 10% to 40%, and most preferably 20%–30% on a weight basis. If the fluorine content of the fluorine-containing hydrophilic copolymer becomes too high, the hydrophilic properties of the polymer may be lessened.

The copolymer is fixed with respect to rotation by crosslinking it with a multifunctional epoxide. Representative epoxides include ethylene glycol diglycidyl ether, i.e.,

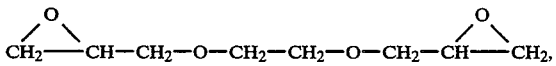

and
1,4-butane diol diglycidyl ether, i.e.,

1, 2, 7, 8-diepoxyoctane (a mutagen); 1, 2, 4, 5, 9, 10-triepoxydecane, or the like.

These epoxides are believed to react with the —OH of the TFE/VOH copolymer with no net loss of —OH functions, since the epoxide rings open to form —OH groups in the cross-linking moiety.

The coated compositions of the invention may be prepared by first dissolving the copolymer in a solvent containing the epoxides. The solution and a crosslinking catalyst is then applied to the substrate by immersion or spraying or transfer coating. The coated product is then dried and cured in an oven, for example at about 80° C., or can be cured during air-drying.

Suitable solvents are those which will dissolve the copolymer, e.g. alcohols, which flash off prior to the curing reaction.

In the following examples, the copolymer employed was a copolymer of tetrafluoroethylene and vinyl alcohol of approximately 25% (by weight) alcohol functionality.

EXAMPLE 1

Example Of Cross-linking Reaction

To 200 ml. of a 9% solution of the TFE/VOH in methanol was added 9.4 g of 50% pure ethylene glycol diglycidyl ether (EGDE) (Aldrich Chemical Co., 0.027 equivalents) in methanol. About 50 ml of this clear viscous solution was poured into a petri dish. This served as an uncatalyzed sample. Another 50 ml. of this TFE/VOH+EGDE solution was treated with 8 g of a 10% aqueous solution of KOH, the catalyst for the cross-linking reaction. This solution mix was vigorously stirred and poured into a petri dish. These catalyzed and uncatalyzed samples were left to cure at room temperature. After 53 hrs., it was observed that the uncatalyzed sample was now a thick film, very clear, with a light yellow tint and was very supple. The KOH catalyzed sample was also a film, thick, fairly clear, more stiff than the uncatalyzed sample. These films were further dried in a vacuum oven at 70° C. and 30 in. Hg for 2 hours. They became yellowish and much stiffer.

To determine whether cross-linking had occurred, the following was done:

In three separate beakers containing dimethylformamide (DMF), (1) a pure TFE/VOH film was added to one; (2) a sample of the uncatalyzed TFE/VOH+EGDE film was added to another; and (3) a sample of the KOH catalyzed TFE/VOH+EGDE film was added to the third. Within 15 minutes it was observed that the plain TFE/VOH film had dissolved in the DMF while the other two samples had swollen a little. After overnight immersion, there was still no change, the TFE-VOH treated with the EGDE had still not dissolved.

The above results indicated that reaction with the EGDE had made the TFE/VOH insoluble, thus indicating that cross-linking had occurred.

EXAMPLE 2

A microporous PTFE membrane that has a nominal pore size of 0.1 micron was treated with a 1% TFE/VOH solution in methanol/ethanol (4:1) membrane (sample 2.1). A sample of this membrane was immersed for 5 minutes in an aqueous solution of 2% ethylene glycol diglicidyl ether/0.2% potassium hydroxide (sample 2.2). This sample was stretched on a hoop and allowed to dry at room temperature overnight.

The same procedure was followed for a 0.45 micron pore size microporous PTFE membrane (TFE/VOH only treated material: sample 2.3; a portion of sample 2.3 was immersed for 5 minutes in aqueous 2% ethylene glycol diglicidyl ether/0.2% potassium hydroxide, stretched on a hoop and dried at room temperature overnight (sample 2.4).

A 0.2 micron pore size microporous PTFE laminate was treated with a 2% TFE/VOH solution in methanol/ethanol (4:1) and dried to yield a water-wettable material (sample 2.5). A portion of this sample was immersed for 5 minutes in a 2% ethylene glycol diglicidyl ether/0.2% potassium hydroxide aqueous solution, stretched on a hoop and allowed to dry at room temperature overnight (sample 2.6).

All of the above samples were immediately and completely water-wettable.

Testing of Durability of Water-wettability to Steam Heat

Portions of the above six samples were fixed on metal hoops and subjected to autoclaving at 120° C. for 90 minutes. Immediately after this period of exposure to high temperature steam, the samples were contacted with water and their water-wettability was observed:

| Sample Number | Water-wettability After Autoclaving |
| --- | --- |
| 2.1 | No longer wettable |
| 2.2 | Completely wettable; a few seconds delay |
| 2.3 | No longer wettable |
| 2.4 | Completely wettable; a few seconds delay |
| 2.5 | No longer wettable |
| 2.6 | Completely wettable, a few seconds delay |

These results indicate that crosslinking TFE/VOH with EGDE on a membrane produces a membrane which can maintain water-wettability even after steam sterilization.

EXAMPLE 3

A treatment solution of 1% TFE/VOH, 1% butanediol diglycidyl ether, 0.5% potassium hydroxide in methanol/ethanol (4:1) was prepared. In this solution, the following samples were immersed:

A microporous PTFE laminate of 0.45 micron nominal pore size was immersed for 1 minute. It was dried in a vacuum oven at 85° C., 30 inches mercury pressure, for 2.5 minutes. (Sample 3.1).

A microporous PTFE laminate of 0.45 micron nominal pore size was immersed for 5 minutes. It was dried in a vacuum oven at 85° C., 30 inches mercury pressure, for 2.5 minutes. (Sample 3.2).

A microporous PTFE laminate of 0.1 micron nominal pore size was immersed for 1 minute. It was dried in a vacuum oven at 70°–80° C., 30 inches mercury pressure, for 12 minutes. (Sample 3.3).

A microporous PTFE laminate of 0.1 micron nominal pore size was immersed in above solution for 5 minutes. It was dried in a vacuum oven at 70°–80° C., 30 inches mercury pressure, for 12 minutes. (Sample 3.4).

All of the above samples were completely and immediately water-wettable.

Testing of Durability of Water-wettability to Steam Heat

The above four samples were fixed on hoops and subjected to steam sterilization conditions: 120° C. for 90 minutes. All samples were completely water-wettable. The samples that had been immersed in the treatment solution for only 1 minute appeared to wet out faster than those immersed for 5 minutes.

EXAMPLE 4

Four samples were prepared as follows:

Sample 4.1: On a tenter frame, a microporous PTFE membrane of 0.1 micron nominal pore size was treated with a 1% solution of TFE/VOH (in methanol/ethanol 4:1), followed by dipping in ethanol/water (2:1), followed by dipping in water. This sample was dried in an oven at 80° C. for 6 minutes and further dried at room temperature overnight. The dry, treated membrane was immediately and completely wettable in water.

Sample 4.2: Treatment solution was 1% TFE/VOH, 1.45% butanediol diglycidyl ether, 0.09% potassium hydroxide in methanol/ethanol (4:1). A microporous PTFE membrane of 0.1 micron nominal pore size was fixed on a tenter frame and onto this was dripped the above solution while the membrane was moved on the tenter frame at a line speed of 1.5 feet per minute. The length of the tenter frame was 20 feet. By the time that the wetted membrane had travelled approximately 6 feet, much of the solvent had evaporated. The treated membrane was allowed to dry at room temperature. Then the membrane was subjected to the same treatment on the previously untreated side. Drying was again at room temperature. This treated membrane was now completely and immediately water-wettable.

Sample 4.3: Treatment solution was 1% TFE/VOH, 1.45% butanediol diglicidyl ether, 0.09% potassium hydroxide in methanol/ethanol (4:1). A microporous PTFE membrane of 0.1 micron nominal pore size was fixed on a tenter frame and treated in the same manner as in example 4.2 with the exception that it was dried in an oven at 100° C. with a residence time of 4 minutes. This sample was completely and immediately water-wettable.

Durability Testing of the Water-wettability of Above Samples in Dry Heat

From each of the three samples above portions of membrane were cut and fixed on hoops. These were placed in an oven at specific temperatures for 1 hour. After the exposure to dry heat, the membranes were allowed to return to room temperature and were then sprayed with water to determine water-wettability. At each specific temperature, a fresh, previously unheated sample piece was dry heat tested. In all cases, exposure time to heat was 1 hour. The results were as follows:

| Sample Number | Temperature (°C.) | Water-wettability After Exposure to Heat |
| --- | --- | --- |
| 4.1 | 130 | Complete and immediate |
| 4.2 | 130 | Complete and immediate |
| 4.3 | 130 | Complete and immediate |
| 4.1 | 140 | Incomplete; 10–15 min. to wet |
| 4.2 | 140 | Complete and immediate |
| 4.3 | 140 | Complete; 3–4 sec. to wet |
| 4.2 | 150 | Complete; 0–4 sec. to set |
| 4.3 | 150 | Complete; 2–5 sec. to wet |
| 4.2 | 160 | Complete; 30–45 sec. to wet |
| 4.3 | 160 | Complete; 4–10 sec. to wet |
| 4.2 | 170 | Complete but not perfectly transparent; 20–40 sec. |
| 4.3 | 170 | Complete; 20–40 sec. to wet |

EXAMPLE 5

This Example demonstrates the solvent resistance of crosslinked TFE-VOH copolymers on an expanded porous PTFE (ePTFE) membrane.

Sample 5.1: Treatment solution used was 1% TFE-VOH in methanol/ethanol (4:1). The ePTFE was a microporous PTFE of 0.1 micron nominal pore size. Treatment of the membrane was performed in the same manner as described in Example 4.1. This sample was completely and immediately water-wettable.

Sample 5.2: Treatment solution used was 1% TFE-VOH copolymers/1.45% butanediol diglycidyl ether/0.095 potassium hydroxide in methanol/ethanol (4:1). The membrane was the same microporous PTFE of 0.1 micron nominal pore size described in the above example. Treatment of the membrane was carried out in the same manner as that described for Example 4.1. This sample was completely and immediately water-wettable.

Determination of Solvent Resistance

A pre-weighed portion of samples 5.1 and 5.2 were each separately immersed in 100 ml of N,N-dimethylformamide (DMF) at room temperature. No agitation was used. While microporous PTFE will not wet with DMF, the above-treated microporous ePTFE wet immediately and completely with DMF. After an immersion duration of 15 hours for each sample, the samples were removed from the DMF, fixed on hoops and allowed to dry at room temperature. Wettability to water of each DMF exposed sample was checked with the following results:

| Sample Number | Wettability and Water |
|---|---|
| 5.1 | No wetting. Water beads on surface. |
| 5.2 | Approximately 70% of surface area wet within 3–10 minutes. |

I claim:

1. A hydrophilic, fluid permeable material comprising a substrate having continuous pores through it in which at least a portion of the interior of the substrate is coated with a copolymer of a fluorinated ethylenically unsaturated monomer and vinyl alcohol, wherein the vinyl alcohol units are cross-linked with a multifunctional epoxide, containing at least two functional groups.

2. The material of claim 1 in which the substrate is flexible and is in the form of a fabric, sheet, film, tube, mesh or plug.

3. The material of claim 2 in which the substrate is comprised of a synthetic polymer or natural polymer.

4. The material of claim 1 in which the substrate is comprised of a fluoropolymer.

5. The material of claim 4 in which the fluoropolymer is polytetrafluoroethylene.

6. The material of claim 1 in which the fluorinated ethylenically unsaturated monomer in the copolymer is tetrafluoroethylene.

7. The material of claim 1 wherein the epoxide is a diglycidyl epoxide.

8. The material of claim 1 wherein the epoxide is selected from the class consisting of ethylene glycol diglycidyl ether, and 1,4-butane diol diglycidyl ether.

* * * * *